United States Patent Office 3,109,287
Patented Nov. 5, 1963

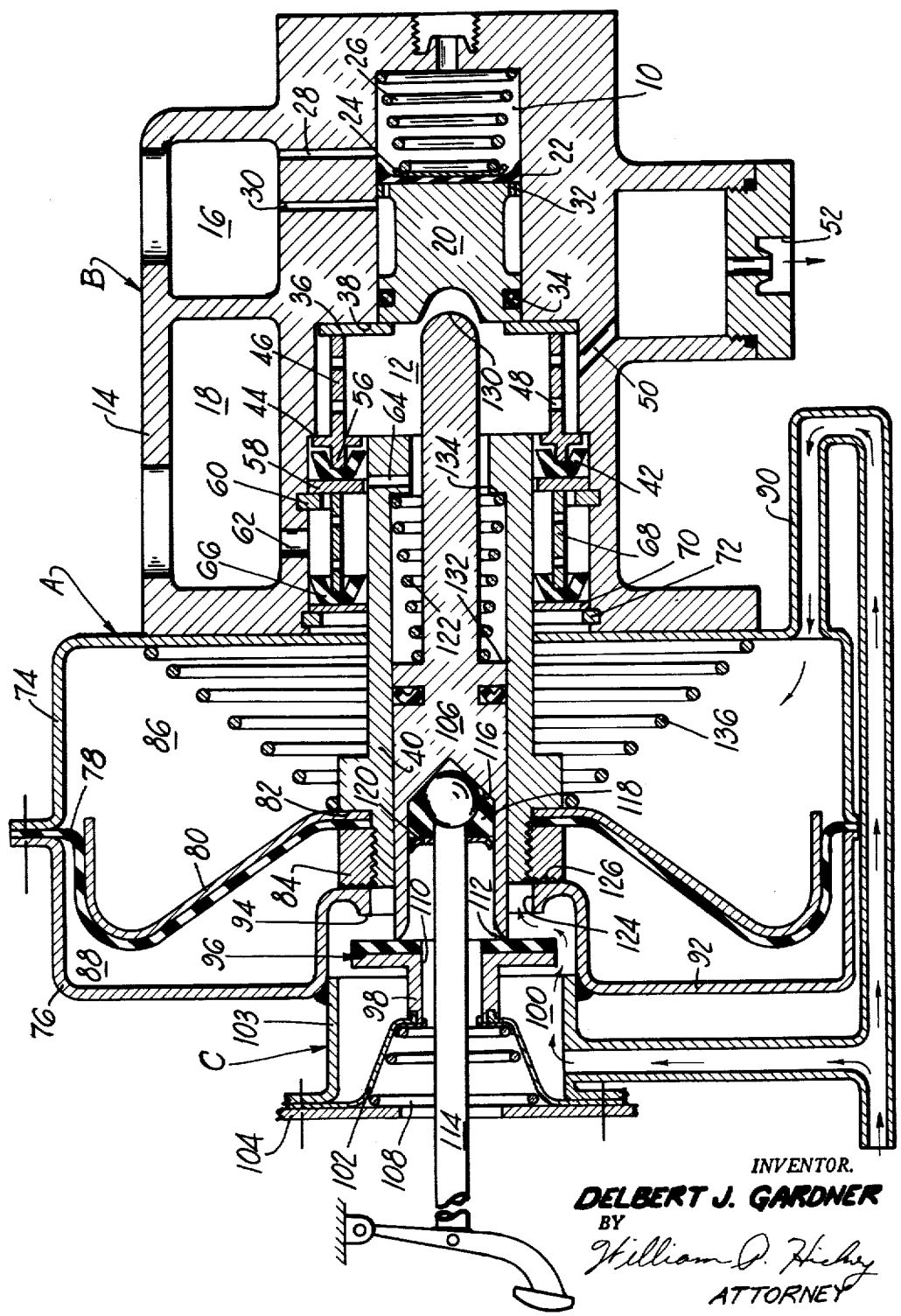

3,109,287
SPLIT SYSTEM POWER BRAKE
Delbert J. Gardner, South Bend, Ind., assignor to The Bendix Corporation, South Bend, Ind., a corporation of Delaware
Filed Nov. 2, 1961, Ser. No. 149,743
9 Claims. (Cl. 60—54.6)

The present invention relates to fluid pressure servomotor driven structures; and more particularly to fluid pressure servomotor driven fluid pressure developing units of the type used to power actuate automotive braking systems and sometimes called power operated master cylinders.

Conventional power brake units which are used to operate the hydraulic braking systems of automotive vehicles embody several features which should be understood before proceeding with the description of the present invention. All of the power brake units which are produced today incorporate what is known as "follow-up" in which there is a movement of a manually actuated control member which is proportional or equal to the driven structure to apprize the operator of the degree of actuation of the driven structure (in this case the vehicle's brakes). All of the units which are made today further include means which permits the driven structure to be operated manually during failure of the servomotor as a safety feature. All of the current units further include a "reaction" feature wherein the control force applied by the operator is resisted by an amount which is less than, but proportional to, the delivered force of the servomotor unit.

The master cylinders of manually actuated braking systems are operated by means of a foot pedal lever arrangement having a mechanical advantage of approximately 6:1 with a foot pedal movement of approximately 6 inches and a master cylinder movement of approximately 1 inch. Since the advent of power braking units, it has been desired to reduce the amount of foot pedal lever travel to a point where it will correspond generally with that of the accelerator pedal so that in most instances, power braking systems are now operated by means of a foot pedal lever system having a mechanical advantage of approximately 3:1, with a foot pedal lever movement of 3 inches, and a servomotor unit movement of approximately 1 inch.

Reducing the amount of mechanical advantage in the brake operating lever system has generally resulted in a sizeable increase in the amount of manual effort which must be exerted upon the brake pedal lever to operate the braking systems during power failure of the servomotor unit. During a sudden power failure in some types of power braking units, there is such a large change in the amount of manual force which must be applied between power and no power conditions, that it is almost impossible to slide the brakes manually during the power off condition. What is more, an operator habitually applies an amount of force to a brake pedal lever which he has learned produces a satifactory braking effort when the power unit is operating; and he subconsciously controls the amount of effort which his foot applies, in order that he will not be thrown from the seat. During a sudden power failure unbeknown to the operator, his foot habitually applies this small predetermined force, and it sometimes takes the operator a period of time to become aware of the fact that the lack of vehicle braking effort is now due to a failure of the power supply to the power unit, and that he must therefore exert a considerably increased effort in order to stop the vehicle.

There have heretofore been some designs of power brake units in which there is no "follow-up." These systems have generally incorporated the control valve structure in a second power piston or movable wall which is designed to work rearwardly toward the operator. During power actuation, the second movable wall biases itself against a rear stop to hold the control valve structure stationary. No follow-up of the driven structure therefore occurs during power operation. During power failure, however, the manually applied force moves the second movable wall into abutment with the power driven movable wall and thereby actuates the driven structure, i.e., the braking system, manually. One such device is shown in the Edwin E. Prather application Serial No. 56,584, filed September 16, 1960. Such a unit is known in the art as a full power unit, inasmuch as the manually controlled force is not added to the force delivered by the power element of the servomotor unit, to deliver a sum total of the two forces to the driven structure as do conventional units.

An object of the present invention is the provision of a new and improved fluid pressure servomotor which does not have follow-up, and therefore has very little operating pedal movement, but which adds the manually applied force to that delivered by the power driven structure of the servomotor to deliver the total of the two forces to the driven structure—thereby allowing the size of the unit to be decreased over that of a corresponding full power unit.

A further object of the present invention is the provision of a new and improved servomotor unit of the vacuum suspended no follow-up type in which there is, and need be, no sliding seal between the unit's actuating control rod and the housing of the servomotor unit.

A still further object of the present invention is the provision of a new and improved fluid pressure servomotor driven master cylinder in which the amount of force which must be applied manually during power failure is a fraction of the force which is delivered by the servomotor unit during its power operation so that the unit can be operated with a foot pedal system having low mechanical advantage and still operate the brakes mechanically with a force considerably below that of conventional units.

A still further object of the present invention is the provision of a new and improved fluid pressure servomotor unit which is extremely simple in its construction, and is inexpensive to manufacture.

The invention resides in certain constructions and combinations and arrangements of parts; and further objects and advantages of the invention will become apparent to those skilled in the art to which it relates from the following description of the preferred embodiment described with reference to the accompanying drawing forming a part of the specification, and in which:

The solitary figure of the drawing is a cross sectional view of a power operated master cylinder of the type used to operate the hydraulic brakes of an automotive vehicle, and which embodies principles of the present invention.

The power operated master cylinder shown in the drawing generally comprises a fluid pressure servomotor A which is suitably fastened to the hydraulic master cylinder B in such manner as to displace fluid therefrom to the hydraulic braking system of an automotive vehicle. Hydraulic master cylinder B may be of any suitable type, as for example the conventional single displacement unit used to operate all four brakes of the vehicle, but will have particular advantages when used in conjunction with a tandem master cylinder of the type having separate fluid displacing chambers 10 and 12 which are used to actuate the front and rear wheel brakes of an automotive vehicle. The fluid displacement chambers 10 and 12 may be used to operate any set of brakes of the vehicle and will have particular advantages when the chamber 10 is used to operate the front wheel brakes of the vehicle because of the load shift which occurs during braking of the vehicle.

The master cylinder B shown in the drawing is formed by means of a cast housing 14 having a longitudinally extending stepped bore therein, the front portion of which forms the fluid displacement chamber 10 and the enlarged rear portion of which forms the fluid displacement chamber 12. The cast housing 14 also includes a pair of separate reservoir chambers 16 and 18 which are positioned in the region above the chambers 10 and 12 respectively. Fluid is displaced out of the fluid displacement chamber 10 by means of a more or less conventional spool shaped master cylinder piston 20 having a conventional rubber cup seal 22 held against its forward face in sealing engagement with the sidewalls of the chamber 10 by means of a retaining washer 24 and coil spring 26. The compensating port 28 extending between the reservoir 16 and the chamber 10 is formed in the sidewalls of the housing 14 just forwardly of the seal 22, in such manner as to be closed off by the lips of the cup 22 upon forward movement of the piston 20. The second compensating passage 30 extends between the reservoir 16 and the sidewalls of the chamber 10 in such manner as to always communicate with the center reduced diameter section of the spool shaped piston 20. A reduction in pressure in the chamber 10, therefore, during rearward movement of the piston 20 permits fluid to flow from the compensating port 30 through passages 32 and around the lip of the seal 22 to prevent subatmospheric pressures from being developed in the chamber 10. A suitable seal 34 is provided on the rear end of the piston 20 to prevent pressure from the rear fluid displacement chamber 12 from flowing through the passage 30. The hydraulic piston 20 is held in the retracted position shown in the drawing by means of the coil spring 26 which holds the rear end of the piston in engagement with an abutment washer 36 that is in turn supported against the shoulder 38 which separates the chambers 10 and 12.

Fluid may be displaced from the rear fluid displacement chamber 12 in any suitable manner, and as shown in the drawing, is forced out of the chamber 12 by means of a displacement member 40 which reciprocates through a suitable stationary seal 42 in the sidewalls of the chamber 12. The sidewalls of the chamber 12 are slightly stepped to provide a shoulder as at 44 against which the annular seal retainer 46 is positioned. Seal retainer 46 has an axially extending tubular portion of such a length as to engage the washer 36 when the retainer is in abutment with the shoulder 44, and the annular portion of the seal retainer is provided with a plurality of suitable openings 48 to permit fluid to flow from the chamber 12, through the passage 50 in the housing 14, to its outlet connection 52. The cup seal 42 is positioned rearwardly of the seal retainer 46 in such a manner that its outer lip sealingly engages the sidewalls of the chamber 12, while its inner lip slidingly engages the surface of the fluid displacement member 40. The seal retainer 46 includes a rearwardly extending axial flange 56 which abuts the seal 42 between its inner and outer lips and holds the seal 42 in engagement with a retaining washer 58 which in turn is held in place by means of a snap ring 60.

In order that fluid can be added to the pressurizing chamber 12 from the reservoir 18 in the retracted position of the fluid displacement member 40, an interconnecting passage 62 is provided between the reservoir and the outer surface of the fluid displacement member 40 rearwardly of the seal 42. A compensating port 64 is provided in the end of the fluid displacement member 40 at a position which lies rearwardly of the seal 42 when the fluid displacement member 40 is in its fully retracted position shown in the drawings so that communication is established with the fluid pressurizing chamber 12. Upon forward movement of the fluid displacement member 40, compensating port 64 is slid underneath and past the lips of the seal 42 to prevent further communication between the reservoir 18 and the fluid pressurizing chamber 12 to thereby cause fluid from the pressurizing chamber 12 to be displaced out through the outlet 52. In order that fluid from the reservoir 18 will not flow rearwardly out of the master cylinder B, a rear annular cup seal 66 is provided rearwardly of the interconnecting passageway 62 in such manner as to sealingly engage both the sidewalls of the chamber 12 and the outside surface of the fluid displacement member 40. The rear annular seal 66 is held against forward movement by an annular seal retainer 68 having suitable flow passages therethrough; and rearward movement of seal 66 is prevented by means of an abutment washer 70, which in turn is held in position by means of the snap ring 72. The construction of the tandem master cylinder shown in the drawing is such that fluid pressure generated in the rear fluid pressurizing chamber 12 is normally exerted against the rear end of the master cylinder piston 20 to cause an identical fluid pressure to be developed in the fluid displacement chamber 10. It should be pointed out however that in some instances it might be desirable to create a pressure in chamber 10 which differs from that in chamber 12 and this can be done by using a stepped bore and differential piston. Equal pressures are therefore delivered to the front and rear wheel brakes of the automotive vehicle.

The servomotor A shown in the drawing, and which drives the fluid displacement member 40 forwardly into the fluid displacement chamber 12 is formed by means of a split shell having front and rear shell sections 74 and 76 between which the outer periphery of a diaphragm 78 is sealingly clamped. The diaphragm is of the curtain type, and is positioned against the rear surface of the diaphragm back-up plate 80. The inner portion of the diaphragm 78 and back-up plate 80 may be suitably affixed to the fluid displacement member 40 in any suitable manner. As shown in the drawing, fluid displacement member 40 is provided with a rearwardly facing shoulder 82 and the back-up plate and diaphragm 78 are held in sealing engagement therewith by means of a threaded hold-down 84 that is threaded onto the rear end of the fluid displacement member 40. Diaphragm 78 and back-up plate 80 in effect divide the internal chamber of the servomotor housing into front and rear opposing power chambers 86 and 88, respectively, into which a differential pressure is admitted to drive the fluid displacement member 40 forwardly.

The servomotor A shown in the drawing is of the vacuum suspended type in which vacuum from the manifold of the vehicle's propelling engine is admitted to both the front and rear opposing power chambers 86 and 88 in normal condition of the servomotor. Vacuum is admitted to the front opposing chamber 86 through the branch vacuum connection 90 and through branch connection 92 to the control valve structure C which controls the operation of the servomotor. During actuation of the servomotor, atmospheric pressure is bled to the rear opposing power chamber 88 to drive the fluid displacement member 40 forwardly.

The control valve structure C shown in the drawing includes a stationary annular vacuum valve seat 94 which is formed as part of the rear shell section 76 and includes an annular poppet member 96 for sealing engagement therewith. The annular poppet member 96 includes a rearwardly extending tubular portion 98; and the low pressure or the vacuum valve chamber 100 is formed by means of a diaphragm 102 which is sealingly fixed between the rearwardly extending portion 98 and an annular extension 103 on the rear shell section 76. The diaphragm 102 may be affixed to the poppet member 96 in any suitable manner, as for instance by vulcanizing or bonding thereto; and the outer periphery of the diaphragm 102 is fastened to the extension 103 by means of a hold-down washer 104 and a plurality of threaded fasteners, not shown. Vacuum is communicated to the vacuum chamber 100 through the branch connection 92, and the diaphragm 102 is sized so that atmospheric pressure on its rear surface will just hold its front flange 96 into sealing engagement with the vacuum valve seat 94 when the control member 106 is out of engagement with the poppet member 96. To further insure a sealing action against the valve seat 94, coil spring 108 is provided between the poppet 96 and washer 104 to provide a predetermined valve seating load.

Atmospheric pressure will, of course, be communicated through the central opening 110 of the poppet member 96 to the front face of the poppet member 96. Air flow through the central opening 110 is regulated by means of the control member 106 which has an atmospheric valve seat 112 on its rear face for sealing abutment with the poppet member 96. The control member 106 is positioned forwardly of the high pressure valve seat portion of the poppet member 96 in order that it can separate therefrom during power failure of the servomotor A. The control member 106 is actuated by means of a ball-ended push rod 114 which extends through the central opening 110 of the poppet member and is held into the bottom end of the receiving bore 116 in the control member 106 by means of a rubber grommet 118 and a retaining washer 120 which is pressed in place. In the normal condition of the servomotor shown in the drawing, the control member 106 is biased rearwardly by means of a coil spring 122 to close off atmospheric communication through the central opening 110 to the rear power chamber 88; and in addition, lift the poppet member 96 off the vacuum valve seat 94 to communicate vacuum to the rear opposing power chamber 88. Vacuum is communicated past the valve seat 94, through the central opening 124 in the rear shell section 76, to the rear opposing power chamber 88. In order that free flow may be accomplished even though the rear end of the displacement member 40 abuts the shell section 76 surrounding the opening 124, the outer edge of the nut is tapered and suitable grooves 126 are provided in the front edge of the shell section surrounding the opening to produce air passages between the members.

During normal operation of the servomotor shown, push rod 114 is moved forwardly causing the poppet member 96 to remain into sealing engagement with the control member 106 until it abuts the vacuum valve seat 94 to seal off further vacuum communication with the rear opposing power chamber 88. Thereafter, further forward movement of the control member 106 allows the rear end of the control member to move out of engagement with the poppet member 96 and communicate atmospheric pressure through the central opening of the poppet member 98 to the rear opposing power chamber 88. This produces a differential pressure across the diaphragm 78 to apply an actuating force upon the fluid displacement member 40 which in turn moves the fluid displacement member forwardly. Forward movement of the fluid displacement member 40 causes its compensating port 64 to slide past the seal 54 and thereafter develop fluid pressure within the rear pressure chamber 12. Pressure in the chamber 12 is simultaneously communicated to the rear braking system connected to its outlet 52, and to the rear surface of the forward hydraulic fluid displacement piston 20 to produce a similar pressure in the front fluid displacement chamber 10. This pressure is of course communicated to the front wheel brakes of the vehicle to simultaneously operate all brakes of the vehicle.

It is desired that the control rod 114 will normally have only such movement as will be necessary to open and close the valve structure C and thereby control the operation of the servomotor A. No follow-up of the fluid displacement member 40 by the control member 106 is normally provided. At the same time, control member 106 must be held adjacent the poppet member 96 by means of a reaction force so that no appreciable movement of the control rod 114 will be perceptible to the operator during power actuation of the unit. This is accomplished in the servomotor shown in the drawing by forming the control member 106 as a hydraulic piston which is suitably sealed with respect to the sidewalls of an opening 128 which extends through the fluid displacement member 40 to communicate with the fluid displacement chamber 12. On forward movement of the fluid displacement member 40, therefore, sufficient fluid displacement is provided to slide the control member 106 rearwardly relative to the fluid displacement member 40 and thereby accommodate the necessary movement of the fluid displacement member 40. After full atmospheric pressure is admitted to power chamber 88 so that no further hydraulic pressure can be created in hydraulic chamber 12, further manual force on the control rod 114 causes abutment 130 to engage piston 20 and develop a greater pressure in the front braking system than in the rear braking system. This feature can be used to limit rear brake actuation below a skidding level, while permitting a further increase in front brake actuation.

It is desired that the brakes of the vehicle can be operated manually during power failure, and further that at least one of the sets of the front or rear wheel brakes may be operated even though the hydraulic failure occurs in the other system. In order that this may be accomplished, the control member 106 is provided with a cylindrical abutment portion 130 which extends through the rear fluid pressurizing chamber 12 into proximity with the rear surface of the master cylinder 20. Sufficient clearance exists between the portion 130 and piston 20 to permit normal control valve movement, after which further forward movement of the control member 106 causes the portion 130 to abut the piston 20. By means of this arrangement the front piston 20 can be operated even during a hydraulic failure in the system connected to the rear pressurizing chamber 12.

In some instances it may be desired to provide an abutment such as the shoulder 132 which will engage another abutment such as the shoulder 134 shortly after the control member 106 moves forwardly from its valve actuating positions wherein it separates from the poppet member 96. With such an arrangement, hydraulic pressure would be created manually during power failure within the rear hydraulic chamber 12 to operate both the front and rear wheel brakes simultaneously. In the preferred embodiment shown in the drawing, however, the shoulders 132 and 134 are spaced sufficiently apart so that they never contact each other. During power failure, therefore, the fluid displacement member 40 will not be actuated manually, and all of the manually applied force will be concentrated on the small area of the hydraulic piston 20 to produce a much greater pressure within the front hydraulic chamber 10. This larger pressure than would otherwise be created, allows the front wheel brakes to be operated with considerably less effort; and inasmuch as the front wheel brakes perform the greater portion of the vehicle's braking effort, the vehicle can be stopped during power failure with considerably less pedal pressure or force than would otherwise be possible.

During normal operation of the system when vacuum is available to operate the servometer A, forward pressure applied to the control rod 114 actuates the control valve structure, as previously described, to move the control member 106 out of engagement with the atmospheric valve seating portion of the poppet member 96. This communicates atmospheric pressure to the rear opposing power chamber 88 causing the fluid displacement member 40 to be moved forwardly to develop a pressure in chamber 12. This pressure produces a reaction upon the control member 106 which forces the control member 106 rearwardly into engagement with the poppet member 96. At this time, the control rod 106 is in sealing engagement with the poppet member 96 to prevent further air flow to the rear opposing power chamber 88, and the brakes are thereby held applied with a constant force. As previously mentioned, the displacement of the fluid displacement member 40 is sufficiently great to supply the demand of the rear wheel system connected to the outlet 52 and the displacement of the front wheel brake system connected to the front chamber 10 so that the abutment 130 does not engage the piston 20.

When it is desired to release the brakes, a reduction of actuating force on the push rod 114 permits the hydraulic reaction pressure on control member 106 to move the control member 106 rearwardly and lift the poppet member 96 off the vacuum valve seat 94. This permits air pressure to be bled out of the rear opposing power chamber 88 to thereby reduce the differential pressure across the diaphragm 78. This allows the power piston return spring 136 in conjunction with the hydraulic pressure in the chamber 12 to move the fluid displacement member 40 rearwardly. Rearward movement of the fluid displacement member 40 drops the pressure within the chamber 12 until the reaction force on the control member 106 no longer exceeds the actuating force being held on the control rod 114, at which time the operator causes a slight shift forward to bring the poppet member 96 into engagement with the vacuum valve seat 94. A complete removal of all actuating force on the push rod 114 allows the control member 106 to abut the poppet member 96, and thereby valve off flow of atmospheric pressure to the rear opposing power chamber 88. At the same time the poppet member 96 is lifted off of the valve seat 94 to again establish vacuum of equal intensity in opposing chambers 86 and 88.

It will be seen that the objects heretofore enumerated as well as others have been accomplished; and that there has been provided a new and improved servomotor driven fluid pressure intensifying unit having improvements both in the servomotor and the fluid pressure developing section which coact with each other to produce results not heretofore achieved in power braking systems.

While the invention has been described in considerable detail, I do not wish to be limited to the particular construction shown and described; and it is my intention to cover hereby all novel adaptations, modifications and arrangements thereof which come within the practice of those skilled in the art to which the invention relates.

I claim:

1. In a power operated tandem master cylinder and the like: a housing having a bore therein, a forwardly positioned movable wall in said bore and having a generally predetermined forward stroke for displacing fluid out of the forward end of said bore, a power driven fluid displacement member projecting into the rear end of said chamber and forming a rear fluid displacement chamber between said movable wall and said fluid displacement member, and a control structure having a control member which power actuates said power driven fluid displacement member when said control member is moved forwardly, said control member being movable relative to said power driven fluid displacement member and projecting into said rear chamber for abutment with said forwardly positioned movable wall.

2. In a power operated tandem master cylinder and the like: a housing having a bore therein, a forwardly positioned movable wall in said bore and having a generally predetermined forward stroke for displacing fluid out of the forward end of said bore, a power driven fluid displacement member projecting into the rear end of said chamber and forming a rear fluid displacement chamber between said movable wall and said fluid displacement member, and a control structure having a control member which power actuates said power driven fluid displacement member when said control member is moved forwardly, said control member being movable relative to said power driven fluid displacement member and projecting into said rear chamber for abutment with said forwardly positioned movable wall, and said control member being movable relative to said power driven displacement member by an amount generally equaling said predetermined stroke of said forwardly positioned movable wall, whereby said forward motion of said control member during power failure will stroke said forwardly positioned movable wall without moving said power driven fluid displacement member.

3. In a power operated tandem master cylinder and the like: a housing having a bore therein, a forwardly positioned movable wall in said bore and having a generally predetermined forward stroke for displacing fluid out of the forward end of said bore, a power driven fluid displacement member projecting into the rear end of said chamber and forming a rear fluid displacement chamber between said movable wall and said fluid displacement member such that said fluid displacement member exerts pressure against said forwardly positioned movable wall upon movement within said rear fluid displacement chamber, a fluid pressure servomotor having a differential pressure actuated movable wall for driving said fluid displacement member forwardly, and a control valve having a rearwardly facing valve seat, an annular poppet member for sealing abutment with said valve seat, a control member slidably received in said fluid displacement member and projecting into said chamber for abutment with said forwardly positioned movable wall, said control member having a rearwardly projecting portion which extends through said valve seat for sealing abutment with said poppet member, sealing means closing off the space between said valve seat and said poppet member in a manner permitting movement of said poppet member toward and away from said seat to form a first valve pressure chamber, and means communicating a second source of pressure to within said annular poppet member, whereby said control member is free to move away from the remaining portion of said control valve to abut said forwardly positioned movable wall and actuate the same without moving said power driven fluid displacement member.

4. In a power operated tandem master cylinder and the like: a housing having a bore therein, a forwardly positioned movable wall in said bore and having a generally predetermined forward stroke for displacing fluid out of the forward end of said bore, a power driven fluid displacement member projecting into the rear end of said chamber and forming a rear fluid displacement chamber which fluid displacement member upon movement into said rear fluid displacement chamber exerts pressure against said forwardly positioned movable wall, a fluid pressure servomotor having a differential pressure actuated movable wall for driving said fluid displacement member forwardly, and a control valve having a rearwardly facing valve seat fixedly supported relative to said housing, an annular poppet member for sealing abutment with said valve seat, a control member slidably received in said fluid displacement member and projecting into said chamber for abutment with said forwardly positioned movable wall, said control member having a rearwardly projecting portion which extends through said valve seat for sealing abutment with said poppet member, sealing means closing off the space between said valve seat and said poppet member in a manner permitting movement of said poppet member toward and away from said seat to form a first valve pressure chamber, and means communicating a second source of pressure to within said annular poppet member, whereby said control member is free to move away from the remaining portion of said control valve to abut said forwardly positioned movable wall and actuate the same without moving said power driven fluid displacement member.

5. In a fluid pressure servomotor for actuating reciprocable driven structure: a housing having front and rear end walls, a movable wall in said chamber dividing said chamber into forwardly and rearwardly positioned opposing chambers, said movable wall being arranged to force driven structure forwardly, and a control valve structure having a main body portion fixed to said rear end wall for producing a differential pressure across said movable wall to drive said movable wall forwardly, said control valve having a manually actuated control member which separates from said body portion upon forward movement, said control valve producing a differential pressure across said movable wall which drives said movable wall forwardly when said control member separates from said main body section, and said control member operatively abutting said driven structure after separating from said main body portion of said control valve.

6. In a fluid pressure servomotor for actuating reciprocable driven structure: a housing having front and rear end walls, a movable wall in said chamber dividing said chamber into front and rear opposing chambers, said movable wall being arranged to force driven structure forwardly, an axially positioned forwardly facing high pressure annular valve seat carried by said rear end wall, a control poppet member positioned forwardly of said high pressure valve seat and normally biased rearwardly into sealing engagement with said valve seat, an axially extending control rod extending forwardly through said valve seat to move said control poppet member out of engagement with said high pressure valve seat at a predetermined position of said control rod and to thereafter abuttingly drive the driven structure upon continued forward movement of said control rod from said predetermined position, means forming a low pressure valve seat and chamber which is opened to said rear opposing chamber when said control rod is moved rearwardly from said predetermined position, and means normally biasing said control rod rearwardly from said predetermined position, whereby said movable wall normally operates the driven structure without follow-up movement by said control rod, and whereby the driven structure is operated mechanically on power failure.

7. In a fluid pressure servomotor for actuating reciprocable driven structure: a housing having front and rear end walls, a movable wall in said chamber dividing said chamber into front and rear opposing chambers, said movable wall being arranged to force driven structure forwardly, said rear end wall having an axially positioned low pressure valve port therethrough communicating with said rear opposing chamber with a rearwardly facing valve seat around said port, an annular poppet member for abutment with said valve seat, said annular poppet member having a central opening through which high pressure is communicated, means movably sealing said annular poppet member to said rear end wall rearwardly of said rear end wall to form a low pressure valve chamber, said front opposing chamber and said low pressure valve chamber having means for communicating a low pressure thereto, and a control member positioned forwardly of said poppet member for abutment therewith when biased rearwardly to seal off its central opening and to lift said poppet rearwardly off of said valve seat, said control member operatively abutting the driven structure upon forward movement from said poppet member when said poppet member abuts said seat, and a control rod extending through said central opening to operate said control member and mechanically drive said driven structure on power failure, and whereby no sliding seals are provided for said control rod.

8. In a fluid pressure servomotor driven fluid pressure intensifying unit:
a housing having a forward chamber and a rear chamber each having front and rear end walls, a first movable wall in said rear chamber dividing said chamber into front and rear variable volume chambers, said movable wall having a normal non-actuated position;
a second movable wall in said front chamber dividing said front chamber into a variable volume chamber and a fluid displacement chamber, a fluid displacement means operatively connected to said first movable wall and arranged to form a portion of a rear wall for said fluid displacement chamber, said fluid displacement means displacing fluid from said fluid displacement chamber and moving said second movable wall upon movement of said fluid displacement means within said rear displacement chamber;
an axially positioned high pressure annular valve poppet means operatively carried by said rear end wall of said housing;
a control member positioned forwardly of said valve poppet and normally biased rearwardly into sealing engagement with said valve poppet, said control member operatively connected to said fluid displacement means and movable relative thereto;
an axially extending control rod projecting through said valve poppet to move said control member out of engagement with said valve poppet at a predetermined position of said control rod;
means forming a low pressure valve seat and chamber which is normally open to said rear variable volume chamber when said control member is in engagement with said valve poppet, said valve seat being adapted to close off said low pressure chamber from said rear variable volume chamber when said control member is moved out of engagement with said poppet; and
said control member having a projection extending within said rear fluid displacement chamber for abutment with said forwardly positioned movable wall whereupon manual effort on said control rod may actuate said fluid displacement means and said second movable wall upon a power failure to said first movable wall.

9. In a fluid pressure servomotor driven fluid pressure intensifying unit of the order described in claim 8 wherein said control member is further characterized as having reaction means operatively connected to said rear fluid displacement chamber and said second movable wall to provide reaction forces for said control rod.

References Cited in the file of this patent

UNITED STATES PATENTS

| | | |
|---|---|---|
| 2,642,165 | Banker | June 16, 1953 |
| 2,775,957 | Anderson | Jan. 1, 1957 |
| 2,842,101 | Price | July 8, 1958 |
| 2,844,941 | Ayers | July 29, 1958 |
| 2,875,582 | Hill | Mar. 3, 1959 |
| 2,887,848 | Rike | May 26, 1959 |
| 2,894,490 | Ingres | July 14, 1959 |

UNITED STATES PATENT OFFICE

CERTIFICATE OF CORRECTION

Patent No. 3,109,287                          November 5, 1963

Delbert J. Gardner

It is hereby certified that error appears in the above numbered patent requiring correction and that the said Letters Patent should read as corrected below.

Column 6, line 40, for "positions" read -- position --; line 60, for "servometer" read -- servomotor --.

Signed and sealed this 19th day of May 1964.

(SEAL)
Attest:
ERNEST W. SWIDER

EDWARD J. BRENNER
Attesting Officer                                    Commissioner of Patents